US007804200B2

(12) United States Patent
Flaherty (10) Patent No.: US 7,804,200 B2
(45) Date of Patent: Sep. 28, 2010

(54) PHOTOSENSOR CIRCUITS INCLUDING A SWITCH MODE POWER CONVERTER

(75) Inventor: Richard Charles Flaherty, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 160 days.

(21) Appl. No.: 12/106,631

(22) Filed: Apr. 21, 2008

(65) Prior Publication Data

US 2009/0261660 A1    Oct. 22, 2009

(51) Int. Cl.
*H01H 35/14*    (2006.01)
(52) U.S. Cl. ...................................... 307/117
(58) Field of Classification Search ............... 307/117; 363/16

See application file for complete search history.

(56) References Cited

U.S. PATENT DOCUMENTS

| | | | |
|---|---|---|---|
| 3,753,012 | A | 8/1973 | Frederiksen et al. |
| 6,903,942 | B2 | 6/2005 | Flaherty ...................... 363/16 |
| 7,054,169 | B2 * | 5/2006 | Huh et al. ................ 363/21.16 |
| 2004/0155638 | A1 | 8/2004 | Flaherty |

OTHER PUBLICATIONS

International Search Report and Written Opinion (14 pages) corresponding to International Application No. PCT/US2009/002435; Mailing Date: Jun. 26, 2009.

* cited by examiner

*Primary Examiner*—Michael Rutland Wallis
(74) *Attorney, Agent, or Firm*—Myers Bigel Sibley & Sajovec P.A.

(57) ABSTRACT

Photosensor circuits include a relay coil configured to control application of an alternating current (AC) power source to a load. A pulse width modulator circuit is configured to generate a pulse width modulated signal having a pulse width that varies responsive to an average voltage across the relay coil. A drive transistor controls the average voltage across the relay coil responsive to the pulse width modulated signal. A photo control circuit controls application of the pulse width modulated signal to the drive transistor responsive to a detected light level. A half-wave rectifier provide a power signal to the pulse width modulator circuit and the photo control circuit during one of the halves of the line cycle of the AC power source. The photo control circuit includes a phototransistor. A low pass filter circuit filters the output current of the phototransistor to provide a light level signal voltage. A select transistor couples the pulse width modulated signal to the drive transistor during one of the halves of the line cycle of the AC power source responsive to the light level signal voltage having a selected level. A capacitor coupled between the second terminal of the phototransistor and the neutral bus modulates an amount of positive feedback through the first terminal of the phototransistor proportional to a current flowing through the relay coil to provide hysteresis to control of the relay coil by the photosensor circuit.

19 Claims, 5 Drawing Sheets

PHOTOSENSOR CIRCUITS INCLUDING A SWITCH MODE POWER CONVERTER

BACKGROUND OF THE INVENTION

The present invention relates to photosensor circuits and, more particularly, photosensor circuits for light level switching control.

Photo controllers are devices that automatically turn electrical devices on and off in response to the ambient light level. They are used, for example, on street lights to automatically turn them off during the day and on at night. They are also used on billboard lighting systems to turn the billboard lights on early at night, off late at night during periods of low vehicular traffic, on again during early morning rush hour periods when high traffic levels resume, and then off during the daylight hours. Photo controllers may also be used in reverse, for example, to turn a golf course water fountain on during the day and off at night.

A variety of devices, including photo controllers may make use of power converters to convert relatively high voltage alternating current to relatively low voltage direct current as is used in many conventional electronic devices. Some conventional power converters make use of large, high-voltage resistors to drop the voltage. However, these resistors are typically inefficient and generate high heat. The heat generated from the resistors may require that the resistors be housed in a large package and include heat dissipating elements, such as heat sinks. Also, the high heat generated by the resistors can lead to problems with reliability and longevity in the resistors and in other electronic components situated near the resistors.

Another conventional approach to power conversion is the use of a switch mode power converter. The switch mode power converters typically require six transistors or a micro-controller to implement. The requirement for multiple transistors or a micro-controller may cause the implementation of switch mode power converters to be cost prohibitive in some applications, such as in photo controllers.

Figure 1:
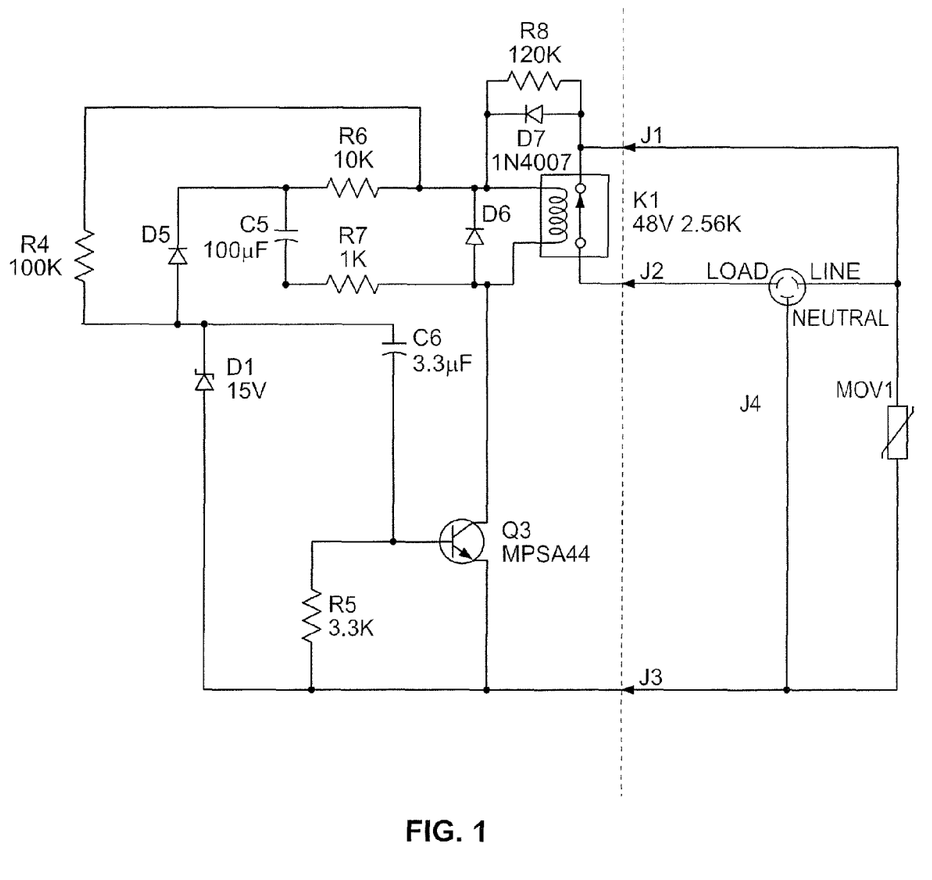
FIG. 1 is a circuit diagram of a power regulator according to the prior art.

A small, low cost, efficient switch mode power converter is described in U.S. Pat. No. 6,903,942 ("the '942 patent"), which is hereby incorporated herein by reference as if set forth in its entirety. The switch mode power converter of the '942 patent is illustrated in FIG. 1. The circuit shown in FIG. 1 is a switch mode power regulator, which implements power line synchronized pulse width modulation (firing angle modulation). The circuit comprises a power circuit and a control circuit. The power circuit comprises an output stage, which comprises a transistor Q3. The transistor's collector circuit comprises a relay K1 and a diode D6, known as a snubber diode, in parallel with the relay K1.

The circuit further comprises a first capacitor C6 coupled to the base of the transistor Q3, a first resistor R4 coupled in series to the first capacitor C6, and a second resistor R8 coupled in series to the first resistor R4. The circuit shown further comprises a first diode D7 coupled in parallel with the second resistor R8. The circuit further comprises a third resistor R5 coupled to the base of the first transistor Q3 and a Zener diode D1, whose cathode is connected to the first capacitor C6 and a second diode D5, and whose anode is connected to the third resistor R5.

The circuit also comprises a fourth resistor R6 coupled in series with the third diode D5, a relay K1 coupled in series with the fourth resistor R6, a third diode D6 coupled in parallel with the relay K1, a second capacitor C5 coupled to the fourth resistor R6, a fifth resistor R7 coupled in series with the second capacitor C5; and a plug, comprising a load, a neutral, and a line, wherein the load is coupled to the relay K1, the neutral is coupled to the emitter of the transistor Q3, and the line is coupled to the variable resistor.

Transistor Q3 regulates the average voltage across the relay coil K1 by means of pulse width modulation. In the embodiment shown, transistor Q3 comprises a bipolar transistor, however, transistor Q3 may instead be a field-effect transistor (FET), or an insulated gate bipolar transistor (IGBT), provided a diode is placed cathode to drain and anode to source.

Transistor Q3 starts conducting at the start of the power line cycle (0 degrees) and continues conducting until enough current has flowed to maintain the relay voltage at the desired level. When transistor Q3 turns off, a voltage will be induced across the relay coil K1 by magnetic induction. This voltage is partially suppressed by diode D6 in order to prevent the failure of transistor Q3 due to over voltage.

The circuit shown in FIG. 1 utilizes half-wave rectification. Half-wave rectification is less expensive that fill-wave rectification and requires less components. Since the relay K1 is highly inductive, it does not require a particularly clean DC signal. For example, the DC signal may include a large amount of ripple, which will not affect the operation of relay K1. Half wave rectification allows the circuit to operate in two modes, positive and negative. During the positive half, the transistor Q3 generates a current pulse, which is regulated by the average voltage across the relay K1. This process is pulse width modulation.

The control circuit shown in FIG. 1 comprises a pulse generator whose pulse width varies proportionately with the difference between the Zener voltage of diode D1 and the average voltage across the relay K1. At the start of the power line cycle (0 degrees), a current will begin to flow through diode D7, resistor R4, capacitor C6, and the base of transistor Q3. The current will cause transistor Q3 to turn on, starting a pulse.

Diode D7 and Resistor R8 provide half-wave power rectification. Resistor R8 is applied across the power rectifier D7, applying a negative current during the negative half of the line cycle. Resistor R8 allows a small negative current to be applied. Resistor R8 provides the negative current that switches on transistor Q3 during the negative half of the line cycle. That negative charge conducted through R8 must exceed the charge that conducts through capacitor C6 to assure transistor Q3 will turn on. Negative current switches on rectifier D6 and turns on transistor Q3, providing a current path between the low voltage side of capacitor C5 through resistor R7.

In the embodiment shown, without resistor R7, transistor Q3 would not saturate during the current pulse, causing excessive power to be dissipated in transistor Q3. The transistor Q3 collector voltage would drop until diode D5 would conduct, diverting base current from transistor Q3 and preventing transistor Q3 from saturating. During the transistor Q3 current pulse, a voltage is generated across resistor R7 that will keep diode D5 from conducting and preventing transistor Q3 saturation. To prevent diode D5 from conducting during the positive half of the line cycle, a voltage of at least the capacitor C6 ripple voltage must drop across resistor R7. Transistor Q3 does start conducting until the instantaneous line voltage is approximately twice the Zener voltage of diode D1.

Capacitor C5 filters the voltage across the relay K1. If the value of C5 is too small the relay coil current will oscillate on and off during power up causing the relay contacts to chatter. Therefore, capacitor C5 shown is large enough a value to prevent this chattering of the relay contacts.

Capacitor C6 is pre-set to the output voltage and provides a timing functionality. During the positive half of the line cycle, a current flows through resistor R4 to capacitor C6, causing it to start charging, and through the base of transistor Q3, which will turn transistor Q3 on. Transistor Q3 remains on as long as a current flows through capacitor C6. Increasing the value of capacitor C6 has the positive effect of increasing the gain of the feed back loop of the regulator circuit. However, increasing the value also slows the time it takes for the current pulse of transistor Q3 to be turned off, increasing commutation losses in transistor Q3, and increases the time for the regulator circuit to stabilize at startup.

As this current flows, the voltage across capacitor C6 increases. When the voltage across capacitor C6 plus the base to emitter voltage of transistor Q3 reaches the Zener voltage of diode D1, the current flowing through capacitor C6 ceases because the current is diverted to the Zener diode D1. Zener diode D1 provides the reference voltage to which the relay coil voltage will be regulated. When the current through capacitor C6 ceases, no current flows to the base of transistor Q3, turning it off and ending the pulse.

During the negative half of the line cycle, a current flows through resistor R8, diode D6, the collector and base of transistor Q3, and resistor R5. This current will turn transistor Q3 on. Also, during the negative half of the power line cycle, resistor R5 provides part of the current path through which capacitor C6 discharges into C5.

During the positive half of the line cycle at the end of the current pulse, resistor R5 causes transistor Q3 to more rapidly turn off, reducing energy losses during the commutation of transistor Q3. Resistor R5 will shunt some of the current that would otherwise go through the base of transistor Q3 during the pulse of transistor Q3 base current. If the current shunted is too much, the base current of transistor Q3 will not be enough to turn transistor Q3 completely on.

Capacitor C6 will now discharge into capacitor C5 until their voltages equalize. The voltage across capacitor C5 is equal to the average voltage across the relay coil K1. Diode D7 disconnects during the negative half of the power line cycle assuring that the relay current is direct current. As such, the discharge of capacitor C6 into capacitor C5 determines the pulse width for operation of the transistor Q3, which in turn allows current flow to establish the average mean voltage of relay coil K1.

The circuit shown in FIG. 1 also comprises a voltage averaging circuit, further comprising resistor R6, capacitor C5, and resistor R7. The averaging circuit essentially measures the average voltage across the relay coil K1. The average voltage across capacitor C5 is the voltage to which the circuit is regulated. The purpose of resistor R7, apart from forming part of the averaging circuit is also to ensure that diode D5 will not conduct during the positive half of the power line cycle. The current to resistor R8 flows through diode D6, turning it on, and then the current flows through the collector of transistor Q3, causing it to turn on. When transistor Q3 turns on, it creates a base current between the emitter of transistor Q3 and the negative end of capacitor C5. When the current begins flowing, diode D5 starts conducting, which causes capacitor C6 to discharge until at the same voltage as capacitor C5. The capacitors reach equal voltage at the average output voltage.

This feedback of the output voltage into the pulse forming circuit determines how long each cycle transistor Q3 will be turned on. (The feed back loop is as follows. Average voltage of relay coil K1 voltage-->voltage of capacitor C5-->voltage of capacitor C6-->duty cycle of transistor Q3 commutation-->average voltage of relay coil K1 voltage.) If the average voltage across the relay coil K1 is too low, the voltage across capacitor C6 will be less than the Zener voltage of diode D1 resulting in a longer On time of transistor Q3, which will cause the average relay coil voltage to increase. If the average voltage across the relay coil K1 is too high the voltage across capacitor C6 will approximate the Zener voltage of diode D1, resulting in a shorter On time of transistor Q3, which will cause the average relay coil voltage to decrease.

The circuit shown in FIG. 1 also comprises a plug J4. Plug J4 is a twist lock Hubble type connector, used to connect a line voltage, neutral voltage, and load. The circuit also comprises a metal oxide variable resistor MOV. MOV is not necessary for the operation of the circuit. It provides a level of protection, eliminating high voltage transients like might come from a lightning strike.

SUMMARY OF THE INVENTION

Embodiments of the present invention provide photosensor circuits including a relay coil configured to control application of an alternating current (AC) power source having a negative half and a positive half of a line cycle to a load. A pulse width modulator circuit is configured to generate a pulse width modulated signal having a pulse width that varies responsive to an average voltage across the relay coil. A drive transistor is coupled between the relay coil and a neutral bus that controls the average voltage across the relay coil responsive to the pulse width modulated signal. A photo control circuit is configured to control application of the pulse width modulated signal to the drive transistor responsive to a detected light level. A half-wave rectifier coupled to the power source is configured to provide a power signal to the pulse width modulator circuit and the photo control circuit during one of the halves of the line cycle of the AC power source. The photo control circuit includes a phototransistor, the phototransistor having a first terminal coupled to the power signal and a second terminal that outputs a current responsive to a level of light detected by the phototransistor. A low pass filter circuit is coupled to the second terminal of the phototransistor that filters the output current of the phototransistor to provide a light level signal voltage. A select transistor couples the pulse width modulated signal to the drive transistor during the one of the halves of the line cycle of the AC power source responsive to the light level signal voltage having a selected level. A capacitor is coupled between the second terminal of the phototransistor and the neutral bus that modulates an amount of positive feedback through the first terminal of the phototransistor proportional to a current flowing through the relay coil to provide hysteresis to control of the relay coil by the photosensor circuit.

In other embodiments, the photosensor circuit does not include a charge pump circuit coupled to the second terminal of the phototransistor. The pulse width modulator circuit includes a Zener diode coupled between the first terminal of the phototransistor and the neutral bus. The pulse width of the pulse width modulated signal varies proportionally with a difference between a Zener voltage of the Zener diode and the average voltage across the relay coil. The phototransistor defines a current path for a positive feedback signal generated across the Zener diode to provide the positive feedback.

In further embodiments, the photosensor circuit is a street lighting photo control device and the load is street lighting. The relay coil is configured to activate to switch off the street lighting responsive to detection of light by the phototransistor. The one of the halves of the line cycle of the AC power source may be the positive half and the half wave rectifier may include a resistor coupled to the AC power source that provides a negative current that activates the drive transistor during the negative half of the line cycle.

In other embodiments, the lowpass filter circuit includes a delay resistor having a first terminal coupled to the second terminal of the photosensor and a delay capacitor coupled between a second terminal of the delay resistor and the neutral bus. The lowpass filter circuit may further include a discharge transistor coupled in parallel with the delay capacitor that has a base coupled to the second terminal of the photosensor. The discharge transistor discharges the delay capacitor to provide the low pass filter circuit an asymmetric delay providing different turn off and turn on times for the load. The discharge transistor may discharge the delay capacitor responsive to a decrease in the level of light detected by the phototransistor while the delay resistor discharges the delay capacitor responsive to an increase in the level of light detected by the phototransistor. The photosensor circuit may be a street lighting photo control device and the load may be street lighting. The photosensor circuit may be configured to turn on the street lighting more rapidly than it turns off the street lighting.

In yet other embodiments, photosensor circuits include a first transistor, having a base, an emitter, and a collector. A first capacitor is coupled to said base of said first transistor. A first resistor is coupled in series to said first capacitor. A second resistor is coupled in series to said first resistor. A first diode is coupled in parallel with said second resistor. A variable resistor is coupled in series with said first diode and further coupled with said emitter of said first transistor. A third resistor is coupled to said base of said first transistor. A Zener diode includes an anode coupled with said third resistor and a cathode coupled with said first capacitor. A second diode is coupled in series with said Zener diode. A fourth resistor is coupled in series with a third diode. A relay coil is coupled in series with said fourth resistor. The third diode is coupled in parallel with said relay coil. A second capacitor is coupled in series to said fourth resistor. A fifth resistor is coupled in series with said second capacitor. A plug includes a load, a neutral, and a line. The load is coupled to said relay. The neutral is coupled to the emitter of said first transistor and the line is coupled to said variable resistor. A photo control circuit is also included.

The photo control circuit includes a photo transistor having a base, a collector, and an emitter. The collector is coupled with the Zener diode. A second transistor has a source coupled to said base of said first transistor. A sixth resistor is coupled to said emitter of said photo transistor and to said anode of said Zener diode. A third capacitor is coupled to said gate of said second transistor and to said anode of said Zener diode. A seventh resistor is coupled to said emitter of said photo transistor and to said third capacitor. A third transistor is coupled in parallel with said third capacitor and/or a fourth capacitor is coupled to said emitter of said photo transistor and to said anode of said Zener diode.

In some embodiments, the photosensor circuit includes said third transistor and said fourth capacitor. In other embodiments, the photosensor circuit includes said third transistor or said fourth capacitor. The photosensor circuit may include said third transistor and said photosensor circuit further includes an eighth resistor coupled to said collector of said photo transistor and to said cathode of said Zener diode.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
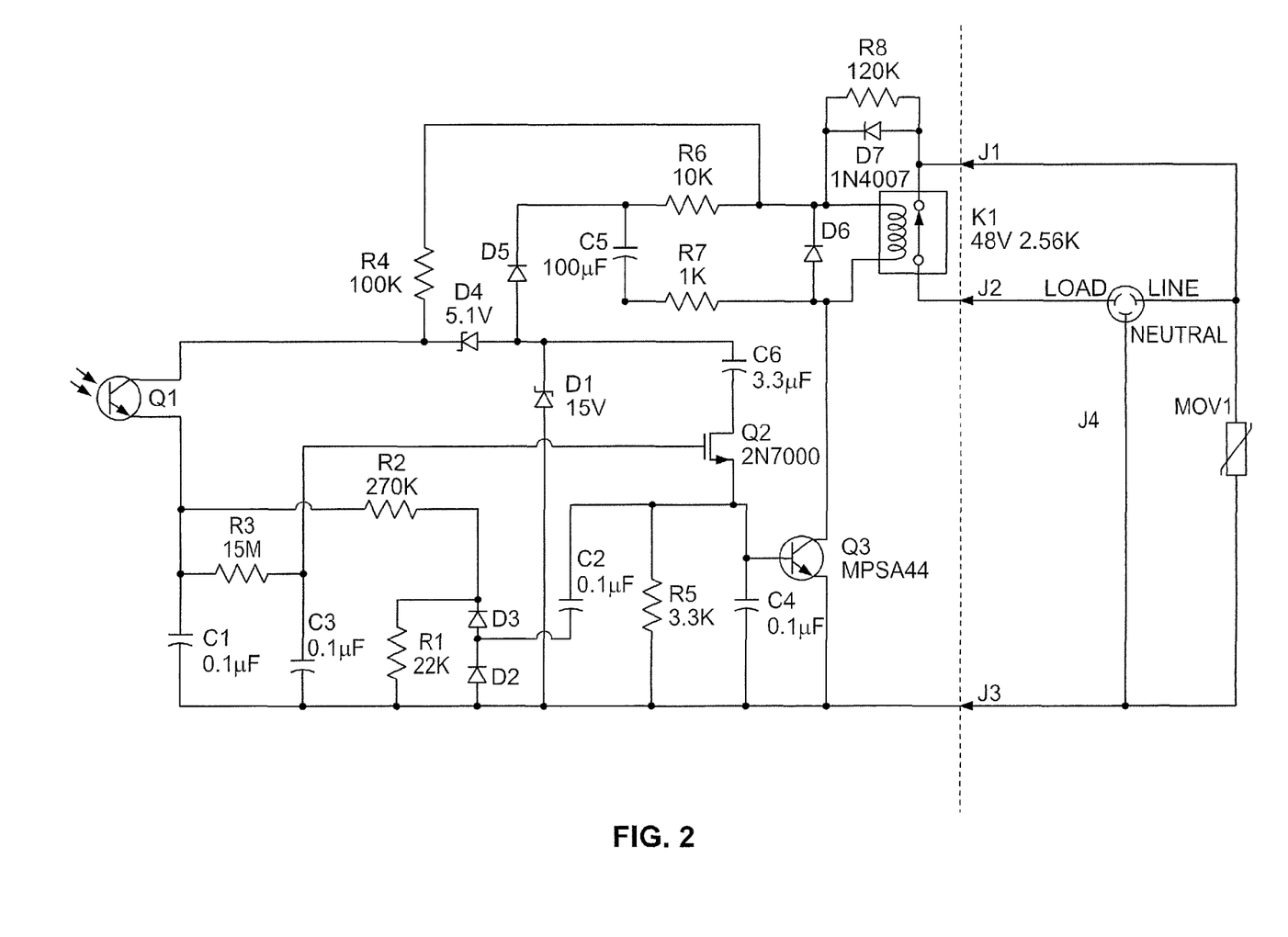
FIG. 2 is a circuit diagram of a photo-controlled power regulator according to the prior art.

As described in the '942 patent, the power regulator illustrated in FIG. 1 may be used in a lighting control system as shown in the circuit diagram of FIG. 2. The circuit shown in FIG. 2 causes a switch to close at dusk and open at dawn, such as for the control of streetlights. The power line voltage of the circuit shown can range from approximately 87 VAC to 305 VAC and have a power line frequency of 50 Hz or 60 Hz. This flexibility may allow the photo control to be usable in almost any alternating current application. To aid in stable operation, the control circuit operates as a Schmitt trigger, switching the output negative at a threshold voltage and not switching back until voltage drops to a lower threshold voltage.

The voltage at the relay coil K1 is converted from alternating current to direct current and regulated to provide for the correct operation of the relay K1. As noted above, because of the inductive nature of the relay coil K1, its voltage can have a large ripple component and it will still operate correctly. The regulated power supply circuit shown in FIG. 1 supplies this regulated direct current to the relay coil K1. Transistor Q2 provides a switch to turn the regulated power supply circuit on or off in order to turn on or off the voltage to the relay coil K1 and hence turn a lamp or the like off or on. The maximum V drain to source will be equal to the Zener voltage of diode D1, 15 V. The maximum drain current is equal to the maximum current that flows through resistor R4.

The current of phototransistor Q1 increases with an increase of ambient light intensity and decreases with a decrease of ambient light intensity. The current from phototransistor Q1 passes through and causes a voltage across resistors R1 and R2. This voltage is proportional to the ambient light level and is referred to as the light signal. As phototransistor Q1's output is a current, the resistor R2, is used to transform current to voltage. R1 serves to convert the feedback current generated by the charge pump made up of D2, D3, and C2 into a voltage. By adjusting the resistance value of R1 the amount of feedback can be adjusted. This resistor could be called a hysteresis control. In most photo control circuits used in street lighting, it is desired that the turn off light level be twice the turn on light level. The value of R1 can be changed until this ratio of on to off light levels is achieved.

As the phototransistors may vary, R2 is usually adjusted to normalize the sensibility to the desired level. R2 may be called the "gain resistor".

Capacitor C1 filters the light signal, removing high frequency noise components that might be induced by lighting, radio interference, or other causes. If this circuit is shielded from external electromagnetic influences, such as radio interference or electromagnetic pulses as caused by lightning, C1 may not be necessary. The low pass filter or time delay circuit, comprising resistor R3 and capacitor C3, causes the light signal to be delayed approximately 1.5 seconds. The delay generally prevents short duration, transient light sources, such as a passing car headlights or a lighting flash causing the lamp to blink on and off. The output of the low pass filter is applied to the gate of phototransistor Q2, which is commuted on or off by the light signal, turning the regulated power supply circuit on or off in order to turn on or off the voltage to the relay coil K1 and hence turn the lamp off or on. A diode may be provided in parallel with resistor R3 to provide an asymmetric delay, allowing turn off and turn on times for street lighting or the like to differ.

The Zener diode D4 ensures that the phototransistor Q1 has a positive voltage across it. Although diode D4 is illustrated in FIG. 2, as is clear to one skilled in the art, it is not necessary. For example, diode D4 can be replaced with a short circuit, and the circuit should continue to function properly.

Capacitor C4 helps make the circuit resistant to radio interference, lightning discharges, and other interference. Like capacitor C1, if this circuit is shielded from external electromagnetic influences such as radio interference or electromagnetic pulses as caused by lightning, C4 may not be necessary.

Diodes D2 and D3 and capacitor C2 form a charge pump circuit. The charge pump circuit converts peak-to-peak alternating current voltage found across resistor R5 into a direct current of the needed polarity to produce positive feedback. The charge pump circuit provides positive feedback proportional to the relay current (output) to create a Schmitt trigger. The Schmitt trigger input to the phototransistor Q1 helps provide stability.

The transistor Q3 commutes the power to the relay, allowing the addition of only one transistor to the circuit to provide photo control. Positive voltage is derived from the low voltage end of resistor R4.

Figure 3:
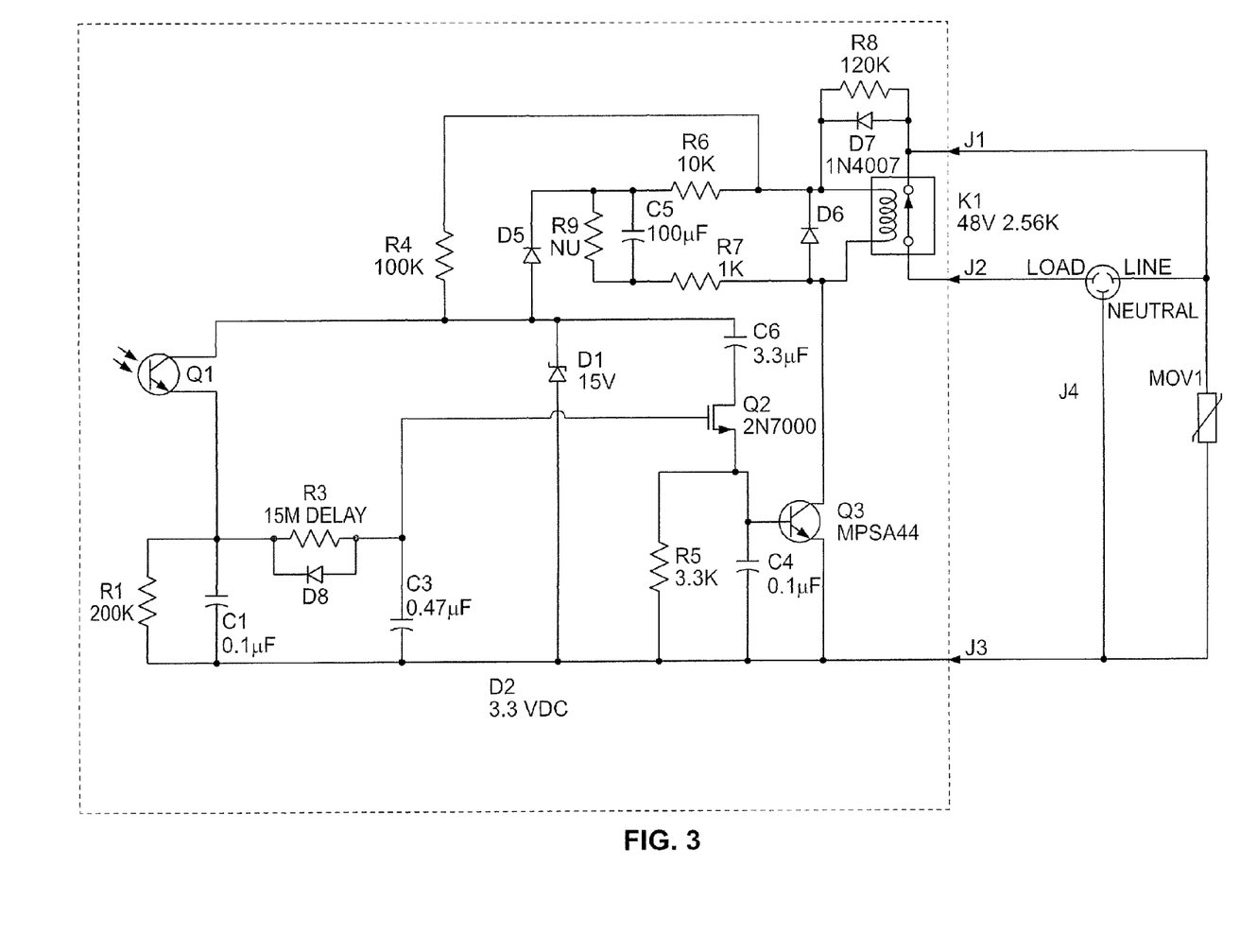
FIG. 3 is a circuit diagram of a photosensor circuit according to some embodiments of the present invention.
Figure 4:
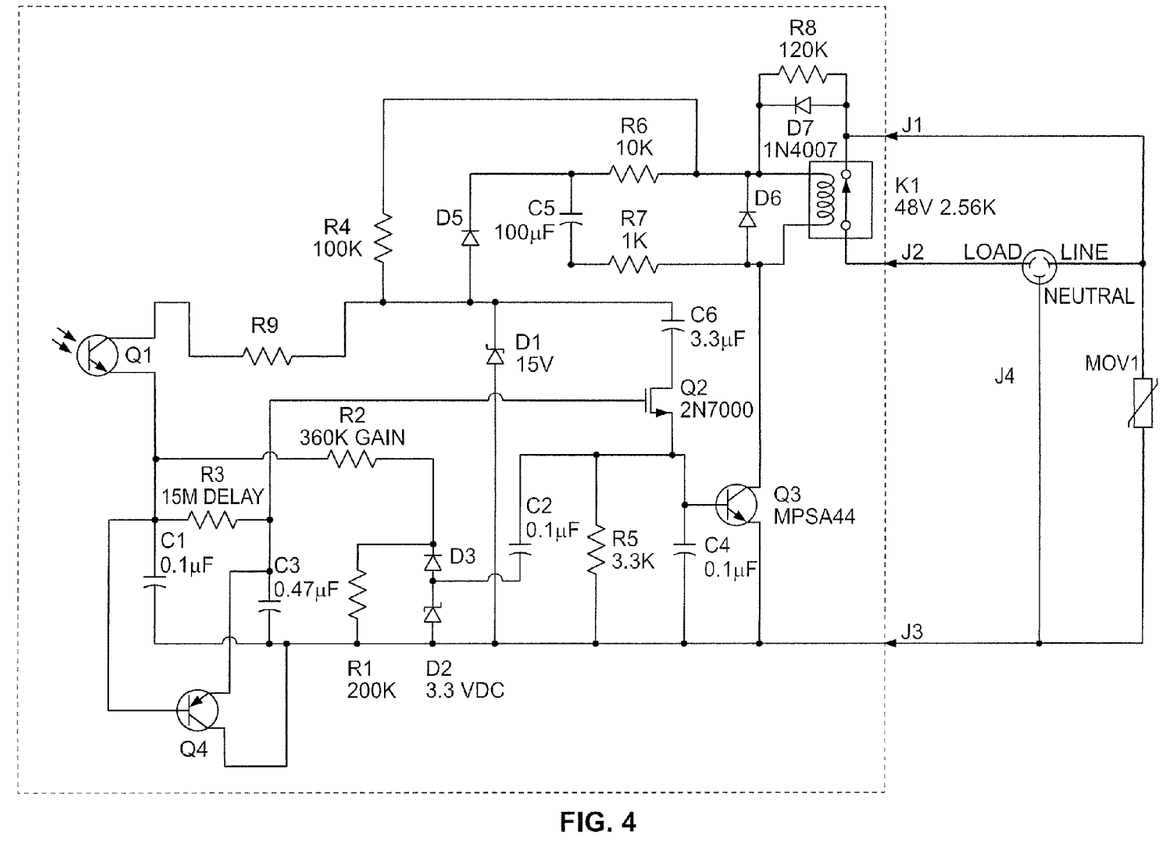
FIG. 4 is a circuit diagram of a photosensor circuit according to further embodiments of the present invention.
Figure 5:
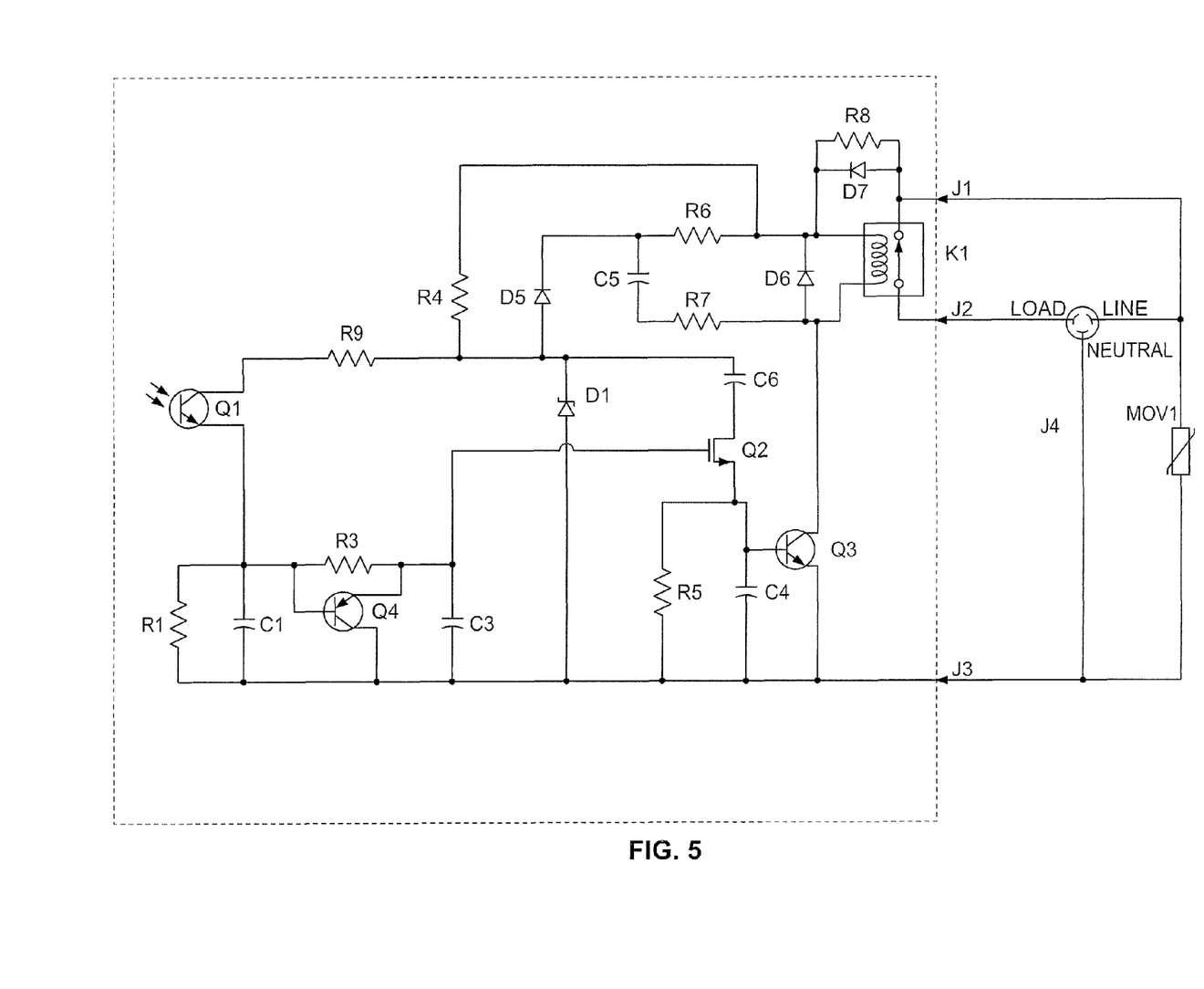
FIG. 5 is a circuit diagram of a photosensor circuit according to further embodiments of the present invention.

Embodiments of the present invention that may provide advantages over the circuit of FIG. 2 will now be described with reference to the circuit diagrams of FIGS. 3 through 5. FIG. 3 illustrates embodiments of a photosensor circuit in which the charge pump circuit of the circuit of FIG. 2 is not used for the positive feedback, allowing a reduction in the components of the circuit and a resultant cost savings. FIG. 4 illustrates embodiments of a photosensor circuit in which a transistor, instead of a diode, is used to discharge the low pass filter capacitor of the circuit of FIG. 2 to provide different turn on and turn off times for the load. FIG. 5 illustrates embodiments of a photosensor circuit combining the teachings of FIGS. 3 and 4 to provide both the reduced component count of FIG. 3 and the different turn on and turn off times for the load of FIG. 4. Common components of the circuit of FIG. 2 and the circuits of FIGS. 3 through 5 operate as described above with reference to FIG. 2 except as specifically described with reference to FIGS. 3 through 5.

As seen in the embodiments of FIG. 3, the charge pump circuit of the circuit of FIG. 2, including diodes D2 and D3 and capacitor C2, is not used. In addition, the gain resistor R2 of the circuit of FIG. 2 is not included in the embodiments of FIG. 3. IN the circuit of FIG. 2, the purpose of the charge pump circuit was to create the positive feed back necessary to create a Schmitt trigger response. In contrast, the embodiments of FIG. 3 obtain the desired positive feed back from the alternating current ripple across diode D1 which is conducted through phototransistor Q1, adjusted in magnitude by capacitor C1 and rectified by diode D8. As a result, three or more components may be eliminated to reduce the cost of the photosensor circuit.

As seen in the embodiments of FIG. 3, the photosensor circuit, includes a relay coil K1. The relay coil K1 controls application of an alternating current (AC) power source LINE from input J1, which carries both negative half and a positive half of a line cycle, to a load LOAD, such as a street light, coupled to input J2. A second reference polarity NEUTRAL is also provided through input J3. The illustrated relay coil K1 operates a normally closed switch so that the default state for the street lighting is turned on and application of a sufficient average voltage to the relay coil K1 turns off the street lighting in the illustrated embodiments. However, the present invention is not limited to such configurations.

As discussed with reference to FIG. 1 above, a pulse width modulator circuit, including components C6, D1, R4 and R5, that generates a pulse width modulated signal having a pulse width that varies responsive to an average voltage across the relay coil K1. A drive transistor Q3 coupled between the relay coil K1 and the neutral bus NEUTRAL controls the average voltage across the relay coil K1 responsive to the pulse width modulated signal input to the gate of the transistor Q3.

For the embodiments illustrated in FIG. 3, a photo control circuit is included that controls application of the pulse width modulated signal to the drive transistor Q3 responsive to a detected light level. The half-wave rectifier, including components D7 and R8, is coupled to the power source and provides a power signal to the pulse width modulator circuit and the photo control circuit during one of the halves of the line cycle of the AC power source LINE.

As seen in the embodiments of FIG. 3, the photo control circuit includes the phototransistor Q1. The phototransistor Q1 has a first terminal coupled to the power signal, through resistor R4, and a second terminal that outputs a current responsive to a level of light detected by the phototransistor Q1. A low pass filter circuit, including components R3 and C3, is coupled to the second terminal of the phototransistor Q1. The low pass filter circuit filters the output current of the phototransistor Q1 to provide a light level signal voltage. The select transistor Q2 couples the pulse width modulated signal to the base of the drive transistor Q3 during the rectified half of the line cycle of the AC power source LINE passed by the diode D7 responsive to the light level signal voltage having a selected level input to the gate of the transistor Q2.

For the embodiments of FIG. 3, a capacitor C1 is used to adjust the amount of positive feedback that is added to the light signal. The capacitor C1 is coupled between the second terminal of the phototransistor and the neutral bus NEUTRAL. The feedback signal, as it is conducted through the phototransistor Q1, is a alternating current signal proportional to the current flowing through the relay coil K1. The capacitor C1 modulates how much of this feed back signal is added to the light signal by shunting the excess feed back signal to the neutral bus NEUTRAL. This alternating current feedback signal is converted to the required direct current signal by the diode D8.

As seen in the embodiments of FIGS. 4 and 5, the low pass filter circuit includes the delay resistor R3, which has a first terminal coupled to the second terminal of the photosensor Q1. The delay capacitor C3 is coupled between a second terminal of the delay resistor R3 and the neutral bus NEUTRAL. A discharge transistor Q4 is coupled in parallel with the delay capacitor C3 and has a gate coupled to the second terminal of the photosensor Q1. The discharge transistor Q4 discharges the delay capacitor C3 to provide the low pass filter circuit an asymmetric delay providing different turn off and turn on times for the load.

Thus, for the embodiments of FIG. 4, the transistor Q4 is illustrated as a PNP transistor is used to provide different turn-off and turn-on times, rather than a diode. In some photosensor applications, an infra red blocking filter is provided over the phototransistor Q1, which generally requires the feedback gain resistor R1 to be increased in value to compensate for the reduction in light sensitivity generally caused by the infra red blocking filter. The increased value of R1 may cause the turn-on delay to lengthen beyond acceptable limits in some embodiments. By replacing a diode with the transistor Q4, the turn-on delay may be decreased to a greater degree. Also shown in the embodiments of FIG. 4 is an additional resistor R9. Resistor R9 may operate to limit or even prevent the $V_{EBO}$ of the phototransistor Q1 from exceeding its maximum rating.

More generally, with respect to the embodiments of FIGS. 3-5, phototransistor Q1 may provide both a current signal proportional to an ambient light level detected by the phototransistor Q1 and a path for positive feedback of a signal generated across zener diode D1. The gain resistor R1 may convert the current signal of the phototransistor Q1 to a voltage signal having an amplitude selected to cause the photocontrol to operate at a desired ambient light level as detected by the phototransistor Q1. The capacitor C1 may have a value selected so as to modulate the amount of positive feedback, which feedback in turn determines the amount of hysterisis provided by the Schmitt Trigger aspect of the photosensor circuit.

The inventor of the present application has determined that the removal of the charge pump components as shown for the embodiments of FIGS. 3 and 5 may not prevent desirable Schmitt trigger operations and further may not substantially affect the instant-on operation of the photosensor circuit in some embodiments of the present invention.

The resistor R3, in combination with the capacitor C3, forms a timed delay circuit that may be used to limit or prevent the photo control from turning off/on during lightening flashes or other momentary light sources detected by the phototransistor Q1.

The transistor Q4 in the illustrated configurations, in response to decreasing light levels, may be used to rapidly discharge capacitor C3 to cause the photosensor circuit to substantially instantly (very quickly) turn-on in response to darkness. Such an approach, for example, may provide for, among other things, rapid testing of photocontrol operations. The transistor Q4 may also detect negative peaks of a positive feedback ripple signal creating a direct current positive feedback signal. The transistor Q2, in response to a detected light level generated voltage signal applied to its gate, may be used to turn the photocontrol relay K1 on and off. Zener diode D1 may provide a reference voltage for the regulation of the relay K1 coil current, provide an operating voltage to the phototransistor Q1 and a ripple voltage generated across the Zener diode D1, which may generally be proportional to relay coil current and may therefore be useful as a positive feedback source for the Schmitt trigger operation as described previously. The resistor R9 may be used to limit the maximum voltage applied across the terminals of the transistor Q4, which may limit or prevent damage to the transistor Q4.

In some embodiments, for the circuit including the transistor Q4, a turn on delay of 20 milliseconds may be provided for substantially instant turn on while a turn off delay of 7.5 seconds may be provided. If the ratio of turn off to turn on light levels becomes too high, the capacitance of capacitor C1 may be increased. If the turn off delay becomes to short, the capacitance of capacitor C3 may have its value increased. In particular embodiments, resistor R9 has a 4.3 MΩ resistance, capacitor C1 has a 2200 picofarads capacitance and transistor Q4 comprises a part number 2N3906 transistor available from Fairchild Semiconductors, Inc. In addition, the phototransistor Q1 in some embodiments may be Model LTR309-R available from LiteOn Corporation of Freemont Calif.

As described above, the pulse width modulator circuit may include the Zener diode D1 coupled between the first terminal of the phototransistor Q1 and the neutral bus NEUTRAL. The pulse width of the pulse width modulated signal varies proportionally with a difference between a Zener voltage of the Zener diode D1 and the average voltage across the relay coil K1. The phototransistor Q1 defines a current path for a positive feedback signal generated across the Zener diode D1 to provide the positive feedback.

The photosensor circuit of any of FIGS. 3-5 may be a street lighting photo control device and the load may be street lighting. The relay coil K1 may be configured to activate to switch off the street lighting responsive to detection of light by the phototransistor Q1. The one of the halves of the line cycle of the AC power source LINE may be the positive half and the half wave rectifier may include the resistor R8 coupled to the AC power source LINE that provides a negative current that activates the drive transistor Q3 during the negative half of the line cycle.

The lowpass filter circuit as described above includes the delay resistor R3 having a first terminal coupled to the second terminal of the photosensor Q1 and the delay capacitor C3 coupled between a second terminal of the delay resistor R3 and the neutral bus NEUTRAL. The lowpass filter circuit may further include the discharge transistor Q4 coupled in parallel with the delay capacitor C3 with a base of the transistor Q4 coupled to the second terminal of the photosensor Q1. The discharge transistor Q4 discharges the delay capacitor C3 to provide the low pass filter circuit an asymmetric delay providing different turn off and turn on times for the load LOAD. The discharge transistor Q4 may discharge the delay capacitor C3 responsive to a decrease in the level of light detected by the phototransistor Q1 while the delay resistor R3 discharges the delay capacitor C3 responsive to an increase in the level of light detected by the phototransistor Q1. The photosensor circuit may be a street lighting photo control device and the load may be street lighting. The photosensor circuit may be configured to turn on the street lighting more rapidly than it turns off the street lighting.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A photosensor circuit, comprising:
   a relay coil configured to control application of an alternating current (AC) power source having a negative half and a positive half of a line cycle to a load;
   a pulse width modulator circuit configured to generate a pulse width modulated signal having a pulse width that varies responsive to an average voltage across the relay coil;
   a drive transistor coupled between the relay coil and a neutral bus that controls the average voltage across the relay coil responsive to the pulse width modulated signal;
   a photo control circuit configured to control application of the pulse width modulated signal to the drive transistor responsive to a detected light level; and
   a half-wave rectifier coupled to the power source that is configured to provide a power signal to the pulse width modulator circuit and the photo control circuit during one of the halves of the line cycle of the AC power source;

wherein the photo control circuit comprises:
   a phototransistor, the phototransistor having a first terminal coupled to the power signal and a second terminal that outputs a current responsive to a level of light detected by the phototransistor;
   a low pass filter circuit coupled to the second terminal of the phototransistor that filters the output current of the phototransistor to provide a light level signal voltage;
   a select transistor that couples the pulse width modulated signal to the drive transistor during the one of the halves of the line cycle of the AC power source responsive to the light level signal voltage having a selected level; and
   a capacitor coupled between the second terminal of the phototransistor and the neutral bus that modulates an amount of positive feedback through the first terminal of the phototransistor proportional to a current flowing through the relay coil to provide hysteresis to control of the relay coil by the photosensor circuit, wherein the low pass filter circuit includes a discharge transistor coupled between the second terminal of the phototransistor and neutral bus and/or a diode coupled between the second terminal of the phototransistor and the neutral bus that rectifies the positive feedback through the first terminal of the phototransistor.

2. The photosensor circuit of claim 1, wherein the photosensor circuit does not include a charge pump circuit coupled to the second terminal of the phototransistor.

3. The photosensor circuit of claim 2, wherein the pulse width modulator circuit includes a Zener diode coupled between the first terminal of the phototransistor and the neutral bus and wherein the pulse width of the pulse width modulated signal varies proportionally with a difference between a Zener voltage of the Zener diode and the average voltage across the relay coil and wherein the phototransistor defines a current path for a positive feedback signal generated across the Zener diode to provide the positive feedback.

4. The photosensor circuit of claim 3, wherein the photosensor circuit comprises a street lighting photo control device and the load comprises street lighting and the relay coil is configured to activate to switch off the street lighting responsive to detection of light by the phototransistor.

5. The photosensor circuit of claim 4, wherein the one of the halves of the line cycle of the AC power source comprises the positive half and wherein the half wave rectifier includes a resistor coupled to the AC power source that provides a negative current that activates the drive transistor during the negative half of the line cycle.

6. The photosensor circuit of claim 1, wherein the lowpass filter circuit comprises a delay resistor having a first terminal coupled to the second terminal of the photosensor and a delay capacitor coupled between a second terminal of the delay resistor and the neutral bus.

7. The photosensor of claim 6, wherein the lowpass filter circuit further comprises the discharge transistor and wherein the discharge capacitor is coupled in parallel with the delay capacitor and has a base coupled to the second terminal of the photosensor, wherein the discharge transistor discharges the delay capacitor to provide the low pass filter circuit an asymmetric delay providing different turn off and turn on times for the load.

8. The photosensor of claim 7, wherein the discharge transistor discharges the delay capacitor responsive to a decrease in the level of light detected by the phototransistor while the delay resistor charges the delay capacitor responsive to an increase in the level of light detected by the phototransistor.

9. The photosensor of claim 8, wherein the photosensor circuit comprises a street lighting photo control device and the load comprises street lighting and wherein the photosensor circuit is configured to turn on the street lighting more rapidly than it turns off the street lighting.

10. A photosensor circuit, comprising:
a relay coil configured to control application of an alternating current (AC) power source having a negative half and a positive half of a line cycle to a load;
a pulse width modulator circuit configured to generate a pulse width modulated signal having a pulse width that varies responsive to an average voltage across the relay coil;
a drive transistor coupled between the relay coil and a neutral bus that controls the average voltage across the relay coil responsive to the pulse width modulated signal;
a photo control circuit configured to control application of the pulse width modulated signal to the drive transistor responsive to a detected light level; and
a half-wave rectifier coupled to the power source that is configured to provide a power signal to the pulse width modulator circuit and the photo control circuit during one of the halves of the line cycle of the AC power source;
wherein the photo control circuit comprises:
a phototransistor, the phototransistor having a first terminal coupled to the power signal and a second terminal that outputs a current responsive to a level of light detected by the phototransistor;
a low pass filter circuit coupled to the second terminal of the phototransistor that filters the output current of the phototransistor to provide a light level signal voltage, wherein the low pass filter circuit comprises:
a delay resistor having a first terminal coupled to the second terminal of the photosensor;
a delay capacitor coupled between a second terminal of the delay resistor and the neutral bus; and
a discharge transistor coupled in parallel with the delay capacitor and having a base coupled to the second terminal of the photosensor, wherein the discharge transistor discharges the delay capacitor to provide the low pass filter circuit an asymmetric delay providing different turn off and turn on times for the load; and
a select transistor that couples the pulse width modulated signal to the drive transistor during the one of the halves of the line cycle of the AC power source responsive to the light level signal voltage having a selected level.

11. The photosensor circuit of claim 10, wherein the pulse width modulator circuit includes a Zener diode coupled between the first terminal of the phototransistor and the neutral bus and wherein the pulse width of the pulse width modulated varies proportionally with a difference between a Zener voltage of the Zener diode and the average voltage across the relay coil and wherein the photosensor circuit includes a positive feedback proportional to a current flowing through the relay coil to provide hysteresis to control of the relay coil by the photosensor circuit.

12. The photosensor circuit of claim 10, wherein the photosensor circuit comprises a street lighting photo control device and the load comprises street lighting and the relay coil is configured to activate to switch off the street lighting responsive to detection of light by the phototransistor.

13. The photosensor circuit of claim 10, wherein the one of the halves of the line cycle of the AC power source comprises the positive half and wherein the half wave rectifier includes a resistor coupled to the AC power source that provides a negative current that activates the drive transistor during the negative half of the line cycle.

14. The photosensor of claim 10, wherein the discharge transistor discharges the delay capacitor responsive to a decrease in the level of light detected by the phototransistor while the delay resistor charges the delay capacitor responsive to an increase in the level of light detected by the phototransistor.

15. The photosensor of claim 14, wherein the photosensor circuit comprises a street lighting photo control device and the load comprises street lighting and wherein the photosensor circuit is configured to turn on the street lighting more rapidly than it turns off the street lighting.

16. A photosensor circuit, comprising:
a first transistor, having a base, an emitter, and a collector;
a first capacitor coupled to said base of said first transistor;
a first resistor coupled in series to said first capacitor;
a second resistor coupled in series to said first resistor;
a first diode coupled in parallel with said second resistor;
a variable resistor coupled in series with said first diode and further coupled with said emitter of said first transistor;
a third resistor coupled to said base of said first transistor;
a Zener diode, comprising an anode coupled with said third resistor and a cathode coupled with said first capacitor;
a second diode coupled in series with said Zener diode;
a fourth resistor coupled in series with a third diode;
a relay coil coupled in series with said fourth resistor, said third diode coupled in parallel with said relay coil;
a second capacitor coupled in series to said fourth resistor;
a fifth resistor coupled in series with said second capacitor;
a plug, comprising a load, a neutral, and a line, wherein said load is coupled to said relay, said neutral is coupled to the emitter of said first transistor, and the line is coupled to said variable resistor; and
a photo control circuit, wherein said photo control circuit comprises:
a photo transistor having a base, a collector, and an emitter; said collector coupled with said Zener diode;
a second transistor, having a source coupled to said base of said first transistor;
a sixth resistor coupled to said emitter of said photo transistor and to said anode of said Zener diode;
a third capacitor coupled to said gate of said second transistor and to said anode of said Zener diode;
a seventh resistor coupled to said emitter of said photo transistor and to said third capacitor; and
a third transistor coupled in parallel with said third capacitor and/or a fourth capacitor coupled to said emitter of said photo transistor and to said anode of said Zener diode.

17. The photosensor circuit of claim 16 wherein the photosensor circuit includes said third transistor and said fourth capacitor.

18. The photosensor circuit of claim 16 wherein the photosensor circuit includes said third transistor or said fourth capacitor.

19. The photosensor circuit of claim 16 wherein the photosensor circuit includes said third transistor and photosensor circuit further comprises an eighth resistor coupled to said collector of said photo transistor and to said cathode of said Zener diode.

* * * * *